(12) United States Patent
Deuringer et al.

(10) Patent No.: US 6,961,407 B2
(45) Date of Patent: Nov. 1, 2005

(54) DEVICE TO DETECT PRESSURE IN AN X-RAY TUBE

(75) Inventors: Josef Deuringer, Herzogenaurach (DE); Jörg Freudenberger, Baiersdorf (DE); Peter Schardt, Höchstadt (DE); Markus Schild, Herzogenaurach (DE)

(73) Assignee: Siemens Aktiengesellschaft, Munich (DE)

(*) Notice: Subject to any disclaimer, the term of this patent is extended or adjusted under 35 U.S.C. 154(b) by 6 days.

(21) Appl. No.: 10/815,041

(22) Filed: Mar. 31, 2004

(65) Prior Publication Data
US 2004/0240617 A1 Dec. 2, 2004

(30) Foreign Application Priority Data
Mar. 31, 2003 (DE) .......................... 103 14 538

(51) Int. Cl.[7] ................................. H01J 35/06
(52) U.S. Cl. ................ 378/136; 378/123; 378/109; 378/111
(58) Field of Search ............... 378/109, 111, 378/113, 117, 118, 119, 121, 123, 122, 136

(56) References Cited

U.S. PATENT DOCUMENTS

| | | | |
|---|---|---|---|
| 4,379,977 A | * | 4/1983 | Carmel et al. ............ 378/136 |
| 4,853,946 A | * | 8/1989 | Elliott et al. ............... 378/4 |
| 4,862,489 A | | 8/1989 | Appelt ..................... 378/118 |
| 6,192,106 B1 | * | 2/2001 | Miller et al. .............. 378/123 |
| 6,586,729 B2 | | 7/2003 | Döring ..................... 250/287 |

FOREIGN PATENT DOCUMENTS

| | | |
|---|---|---|
| DE | 197 07 726 | 9/1998 |
| DE | 196 18 122 | 4/2003 |

* cited by examiner

Primary Examiner—Edward J. Glick
Assistant Examiner—Irakli Kiknadze
(74) Attorney, Agent, or Firm—Schiff Hardin LLP

(57) ABSTRACT

In a method to detect the pressure in an x-ray tube having a cathode of the x-ray tube that is heated with a heater current, and wherein electrons are accelerated between the cathode and an anode by an applied x-ray tube voltage, the heater current is measured, a tube current corresponding to the tube-ray voltage is measured, the difference between the measured heater current and the measured tube current is determined or the temporal change of the measured heater current or of the measured tube current is determined, the difference or the temporal change is compared with predetermined calibration values, and a value representing the pressure in the x-ray tube is determined from the comparison.

8 Claims, 2 Drawing Sheets

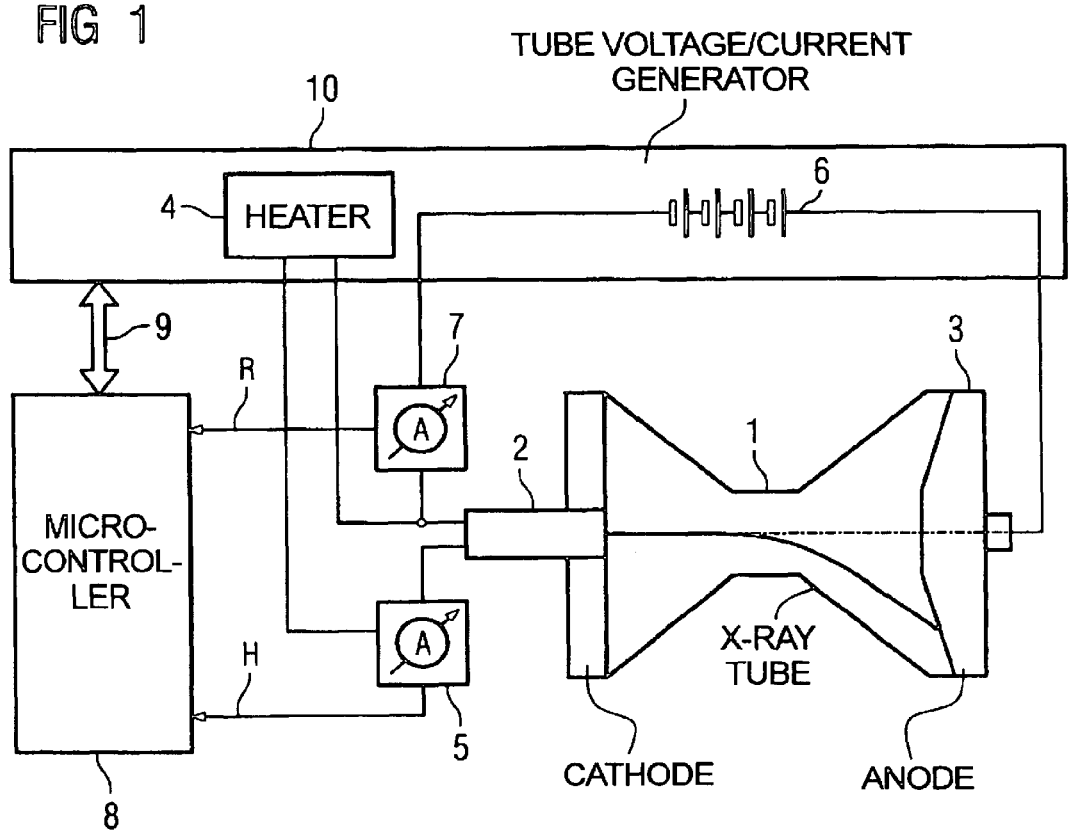

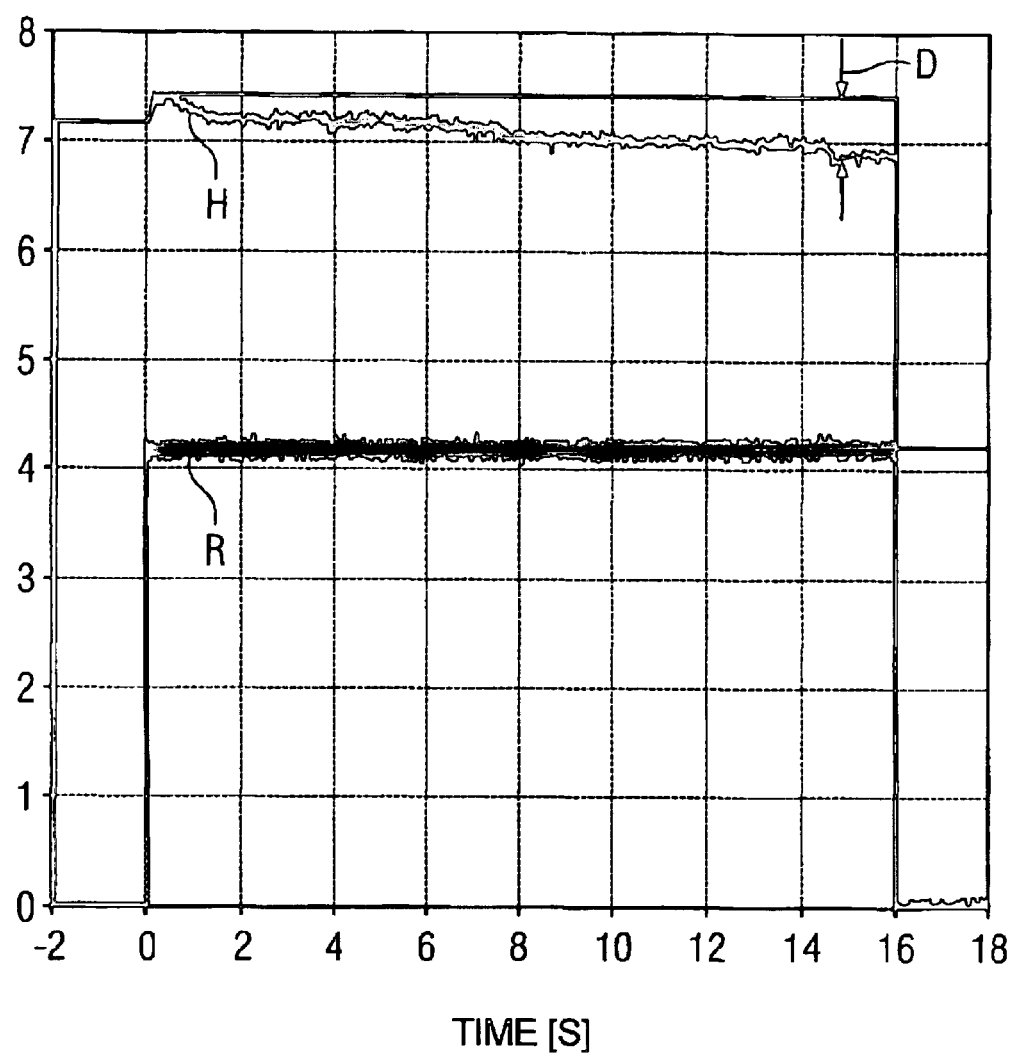

DEVICE TO DETECT PRESSURE IN AN X-RAY TUBE

BACKGROUND OF THE INVENTION

1. Field of the Invention

The present invention concerns a method to detect pressure in an x-ray tube.

2. Description of the Prior Art

A problem in x-ray tubes is that, due to a leakage, an undesired rise in the internal pressure can occur. As a result, generally a reduction of the tube voltage stability first occurs and later a failure of the x-ray tube can occur. An unforeseen failure of an x-ray tube in a running hospital operation causes replacement expense and downtime costs.

From United States Publication Application 2002/0185593, an ion mobility spectrometer is known in which a particular control electrode disposed opposite the cathode is provided to measure the pressure in an x-ray tube. The pressure in the x-ray tube is measured by a fault current flowing between the control electrode and the cathode.

SUMMARY OF THE INVENTION

An object of the present invention to provide a method for measuring the pressure in an x-ray tube that avoids the disadvantages according to the prior art. In particular, it is an object to provide an optimally simply and cost-effectively implementable method to detect the pressure prevalent in an x-ray tube.

The above object is achieved in accordance with the invention, a method is provided to detect the pressure in an x-ray tube, wherein a cathode of the x-ray tube is heated with a heater current, and wherein electrons are accelerated between the cathode and an anode by a tube voltage, and wherein the heater current is heated, a tube current corresponding to the tube voltage is measured, the difference between the measured heater current and the measured tube current is determined or the temporal change of the measured heater current or the temporal change of the measured tube current is measured, the difference or the temporal change is compared with predetermined calibration values, and a value representing the pressure in the x-ray tube is determined from the comparison.

The above method can be implemented without great expenditure. In particular no structural change to the x-ray tube is necessary. By monitoring the temporal change of the heater current in comparison to the applied x-ray voltage or to the applied tube voltage, a decrease of the heater current is obtained in the event of a pressure drop in the x-ray tube, for example given constant tube current. The difference resulting from this is a measure of the pressure drop in the x-ray tube. A value indicating a voltage stability and/or a remaining lifespan can be determined and provided from the value representing the pressure in the x-ray tube. In particular, a determination and display of a remaining lifespan enables an early recognition of a failure of the x-ray tube. The risk of an unforeseen failure of an x-ray tube is reduced.

The x-ray current is advantageously kept constant within a predetermined margin of deviation. In this case, the temporal change of the heater current is appropriately determined, but the difference between the x-ray current and the heater current alternatively can be determined. This embodiment takes advantage of the fact that a device to keep the x-ray current constant is typically provided in x-ray tubes according to the prior art. The method in this case can be simplified by simple observation of the heater current or of the difference between the heater current and the x-ray current.

Naturally, it is also possible to keep the heater current constant within a predetermined margin of deviation. In this case, the temporal change of the x-ray current can be appropriately determined.

According to a further embodiment, a number of differences or temporal changes determined at a predetermined temporal interval are compared to determine the functioning of a device to remove foreign ions. According to the prior art, known tubes are typically equipped with a device to remove foreign ions known as a "getters". Such devices serve to maintain the pressure necessary in the proper operation of the x-ray tube. Such devices wear out with time, i.e. their capability to bind foreign ions decreases at a specific age. As a result, the content of foreign ions then rises, and with it the pressure in the x-ray tube. Such a wear of a getter can be detected with the inventive method.

Naturally, other electrical characteristics also can be determined and evaluated to implement the inventive method. For example, instead of the heater current, it is thus possible to measure and evaluate the heater voltage to detect the pressure in the x-ray tube, and/or to measure and evaluate the tube voltage instead of the tube current.

DESCRIPTION OF THE DRAWINGS

FIG. 1 is a schematic view of the components of a conventional x-ray system.

FIG. 2 is a graph of the heater current and tube current of an x-ray tube over time.

DESCRIPTION OF THE PREFERRED EMBODIMENTS

In the x-ray system shown in FIG. 1, an x-ray tube has a cathode 2 and an anode 3. A heater 4 is connected with the cathode 2 upon activation of a first device 5 for current measurement. A high-voltage source 6 is connected with the cathode 2 and the anode 3 upon interposition of a second device 7 for current measurement. The devices 5, 7 for current measurement are additionally connected to a microcontroller that via an interface 9 is connected with a process computer (not shown) of a tube voltage/current generator 10 that includes the heater 4 and the voltage source 6.

By means of the heater 4, the cathode 2 is heated so as to emit electrons. The applied heater current is measured with the first device 5 for current measurement. The measurement values are provided to the microcontroller 8. The x-ray voltage applied between the cathode 2 and the anode 3 is generated by the high-voltage generator 6. The x-ray current drop is measured by the second device 7 for current measurement. The measurement values are in turn transmitted to the microcontroller 8. The microcontroller 8 calculates the pressure in the x-ray tube 1 according to a predetermined program. The corresponding data are conveyed to a process computer of the x-ray system 10 via the interface 9 and there displayed, as needed, to a user.

The inventive method to measure the pressure in the x-ray tube 1 using the measured current curves is illustrated in FIG. 2. The curves of the measured tube current R and the heater current H are shown over time. The x-ray current R is kept constant in the present case. The heater current H drops in the course of time as a consequence of foreign ions located in the x-ray tube 1. Foreign ions effect an additional heating of the cathode 2, such that a heater current H increasing over time is necessary to maintain the desired temperature. A difference D of the heater current H with regard to an original heater current is designated with the arrows. A comparison of the difference of the heater current H with regard to the original heater current, determined after a predetermined time segment with predetermined calibration values, allows an inference of the pressure in the x-ray tube 1 and with it also an inference of the remaining lifespan of the x-ray tube 1. The measured values can be conveyed to a process computer of the x-ray system 10 via an interface 9, and there displayed to a user. They also be directly transmitted to the manufacturer or a maintenance operator by means of remote data transmission.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for detecting pressure in an x-ray tube having a cathode heated with a heater current and wherein electrons are accelerated between the cathode and an anode by an applied x-ray tube voltage, comprising the steps of:

measuring said heater current;

measuring a tube current corresponding to said applied x-ray tube voltage;

determining a quantity selected from the group consisting of a difference between said heater current and said tube current, a temporal change of said heater current, and a temporal change of said tube current;

comparing said quantity with a predetermined calibration values to obtain a comparison result; and from said comparison result, generating a value representing pressure in said x-ray tube.

2. A method as claimed in claim 1 comprising, from said value representing pressure in the x-ray tube, determining a value indicating a voltage stability of said x-ray tube.

3. A method as claimed in claim 1 comprising, from said value representing pressure in the x-ray tube, determining a value indicating a remaining life span of said x-ray tube.

4. A method as claimed in claim 1 comprising maintaining said tube current constant within a predetermined margin of deviation, and using said temporal change of said heater current as said quantity.

5. A method as claimed in claim 1 comprising maintaining said heater current constant within a predetermined margin of deviation, and using said temporal change of said tube current as said quantity.

6. A method as claimed in claim 1 comprising:

providing a device in said x-ray tube for removing foreign ions;

determining said quantity at least twice at respective points in time, respectively, and thereby obtaining at least two determined quantities; and comparing said at least two determined quantities with each other to obtain a further comparison result and assessing, dependent on said further comparison result, functioning of said device for removing foreign ions.

7. A method for detecting pressure in an x-ray tube having a cathode heated with a heater current produced by a heater voltage and wherein electrons are accelerated between the cathode and an anode by an applied x-ray tube voltage, comprising the steps of:

measuring said heater voltage;

measuring said applied x-ray tube voltage;

determining a quantity selected from the group consisting of a difference between said heater voltage and said x-ray tube voltage, a temporal change of said heater voltage, and a temporal change of said x-ray tube voltage;

comparing said quantity with a predetermined calibration values to obtain a comparison result; and from said comparison result, generating a value representing pressure in said x-ray tube.

8. A method for detecting pressure in an x-ray tube having a cathode heated with a heater current and wherein electrons are accelerated between the cathode and an anode by an applied x-ray tube voltage, comprising the steps of:

measuring said heater current;

measuring a tube current corresponding to said applied x-ray tube voltage;

determining a quantity selected from the group consisting of a difference between said heater current and said tube current, a temporal change of said heater current, and a temporal change of said tube current;

comparing said quantity with a predetermined calibration values to obtain a comparison result; and using said comparison result as a representation of pressure in said x-ray tube.

* * * * *